United States Patent
Abe

(10) Patent No.: US 9,722,432 B2
(45) Date of Patent: Aug. 1, 2017

(54) CONTACTLESS POWER SUPPLYING SYSTEM, ELECTRIC APPLIANCE, REPEATER, AND ADAPTOR

(75) Inventor: Hideaki Abe, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 664 days.

(21) Appl. No.: 14/344,095

(22) PCT Filed: Sep. 13, 2012

(86) PCT No.: PCT/JP2012/005840
§ 371 (c)(1),
(2), (4) Date: Mar. 11, 2014

(87) PCT Pub. No.: WO2013/038675
PCT Pub. Date: Mar. 21, 2013

(65) Prior Publication Data
US 2014/0339911 A1  Nov. 20, 2014

(30) Foreign Application Priority Data
Sep. 15, 2011  (JP) .................. 2011-202125

(51) Int. Cl.
*H01F 38/14* (2006.01)
*H02J 5/00* (2016.01)
(Continued)

(52) U.S. Cl.
CPC .............. *H02J 5/005* (2013.01); *H01F 38/14* (2013.01); *H02J 7/025* (2013.01); *H02J 17/00* (2013.01); *H02J 50/12* (2016.02)

(58) Field of Classification Search
CPC . H01F 38/14; H02J 5/005; H02J 7/025; H02J 17/00; H02J 50/10; H02J 50/12;
(Continued)

(56) References Cited

U.S. PATENT DOCUMENTS 6,157,162 A   12/2000  Hayashi et al.
6,239,577 B1   5/2001  Koike et al.
(Continued)

FOREIGN PATENT DOCUMENTS

CN   101789636 A   7/2010
CN   101971457 A   2/2011
(Continued)

OTHER PUBLICATIONS

Chinese Office Action and Search Report for corresponding Chinese Application No. 201280044448.2 dated Jul. 3, 2015 and English translation.
(Continued)

*Primary Examiner* — Levi Gannon
(74) *Attorney, Agent, or Firm* — Renner, Otto, Boisselle & Sklar, LLP

(57) ABSTRACT

A contactless power supplying system includes a contactless power supplying device provided with a high-frequency inverter and a primary coil and an electric appliance provided with a secondary coil and a power receiving circuit that supplies induced electromotive force generated by the secondary coil to a load. The system further includes a structure having a variable shape and adapted to be independently secured, and at least one of a connecting wire for connecting the primary coil to the high-frequency inverter, a connecting wire for connecting the secondary coil to the power receiving circuit, and a connecting wire for connecting the power receiving circuit to the load. The at least one of the connecting wires is arranged along the structure. The secondary coil is spatially positioned with respect to the primary coil depending on the shape of the structure.

21 Claims, 15 Drawing Sheets

(51) Int. Cl.
  *H02J 7/02* (2016.01)
  *H02J 50/12* (2016.01)
  *H02J 17/00* (2006.01)
(58) Field of Classification Search
  CPC .. H04B 5/0037; H04B 5/0075; H04B 5/0081; H04B 5/0087; H04B 5/0093
  USPC .......................................................... 307/104
  See application file for complete search history.

(56) References Cited

U.S. PATENT DOCUMENTS

| | | | |
|---|---|---|---|
| 8,618,695 B2* | 12/2013 | Azancot | H02J 5/005 307/104 |
| 8,629,577 B2* | 1/2014 | Azancot | H01F 38/14 307/104 |
| 8,887,619 B2* | 11/2014 | Kallmyer | A61N 1/3787 92/56 |
| 2003/0003971 A1 | 1/2003 | Yamamoto | |
| 2004/0145343 A1 | 7/2004 | Naskali et al. | |
| 2007/0182367 A1 | 8/2007 | Partovi | |
| 2007/0279002 A1 | 12/2007 | Partovi | |
| 2009/0096413 A1 | 4/2009 | Partovi et al. | |
| 2009/0179424 A1 | 7/2009 | Yaron | |
| 2010/0181842 A1 | 7/2010 | Suzuki et al. | |
| 2010/0187912 A1 | 7/2010 | Kitamura et al. | |
| 2010/0194336 A1 | 8/2010 | Azancot et al. | |
| 2010/0201201 A1* | 8/2010 | Mobarhan | H02J 5/005 307/104 |
| 2010/0219183 A1 | 9/2010 | Azancot et al. | |
| 2010/0219693 A1 | 9/2010 | Azancot et al. | |
| 2010/0244584 A1 | 9/2010 | Azancot et al. | |
| 2010/0253282 A1 | 10/2010 | Azancot et al. | |
| 2010/0257382 A1 | 10/2010 | Azancot et al. | |
| 2010/0259401 A1 | 10/2010 | Azancot et al. | |
| 2010/0290215 A1 | 11/2010 | Metcalf et al. | |
| 2011/0018360 A1 | 1/2011 | Baarman et al. | |
| 2011/0050164 A1 | 3/2011 | Partovi et al. | |
| 2011/0062789 A1 | 3/2011 | Johnson et al. | |
| 2011/0187320 A1 | 8/2011 | Murayama | |
| 2011/0221385 A1 | 9/2011 | Partovi et al. | |
| 2011/0304217 A1* | 12/2011 | Yamamoto | B60L 11/182 307/104 |
| 2012/0126745 A1 | 5/2012 | Partovi et al. | |
| 2012/0230521 A1 | 9/2012 | Azancot et al. | |
| 2012/0256585 A1 | 10/2012 | Partovi et al. | |
| 2012/0318586 A1 | 12/2012 | Atarashi | |
| 2013/0049482 A1* | 2/2013 | Rofe | H02J 5/005 307/104 |
| 2013/0049484 A1* | 2/2013 | Weissentern | H02J 5/005 307/104 |
| 2013/0053624 A1* | 2/2013 | Zilbershlag | H01F 7/0247 600/16 |
| 2013/0093388 A1 | 4/2013 | Partovi | |
| 2013/0099563 A1 | 4/2013 | Partovi et al. | |
| 2013/0132743 A1 | 5/2013 | Azancot et al. | |
| 2013/0175983 A1 | 7/2013 | Partovi et al. | |
| 2013/0260677 A1 | 10/2013 | Partovi | |
| 2014/0035387 A1 | 2/2014 | Baarman et al. | |
| 2014/0091638 A1 | 4/2014 | Azancot et al. | |
| 2014/0103873 A1 | 4/2014 | Partovi et al. | |

FOREIGN PATENT DOCUMENTS

| | | |
|---|---|---|
| CN | 102025198 A | 4/2011 |
| CN | 102142708 A | 8/2011 |
| JP | 2000-092618 A | 3/2000 |
| JP | 2000-341887 A | 5/2001 |
| JP | 2003-101626 A | 4/2003 |
| JP | 2005-251675 A | 9/2005 |
| JP | 2008-294385 A | 12/2008 |
| JP | 2010-098867 A | 4/2010 |
| JP | 2011-061942 A | 3/2011 |
| JP | 2011-151900 A | 8/2011 |
| JP | 2011-160505 A | 8/2011 |
| KR | 2003-0057842 A | 7/2003 |
| TW | 201111969 A | 4/2011 |
| WO | WO 2005/041381 A1 | 5/2005 |
| WO | WO 2009/047768 A2 | 4/2009 |
| WO | WO 2009/047768 A3 | 4/2009 |
| WO | WO 2010/090333 A1 | 8/2010 |
| WO | WO 2010/129369 A2 | 11/2010 |
| WO | WO 2010/129369 A3 | 11/2010 |
| WO | WO 2011/011681 A2 | 1/2011 |
| WO | WO 2011/108403 A1 | 9/2011 |

OTHER PUBLICATIONS

International Preliminary Report on Patentability for corresponding International Application No. PCT/JP2012/005840 mailed Mar. 18, 2014.
Japanese Office Action for corresponding Japanese Application No. 2011-202125 mailed Mar. 3, 2015.
Japanese Office Action for corresponding Japanese Application No. 2011-202125 dated Oct. 13, 2015.
International Search Report for corresponding International Application No. PCT/JP2012/005840 mailed Oct. 30, 2012.
Korean Office Action dated Nov. 1, 2015 for corresponding Korean Application No. 10-2014-7009687 and English translation.
Extended European Search Report for corresponding European Application No. 12831182.6 dated May 11, 2015.

* cited by examiner

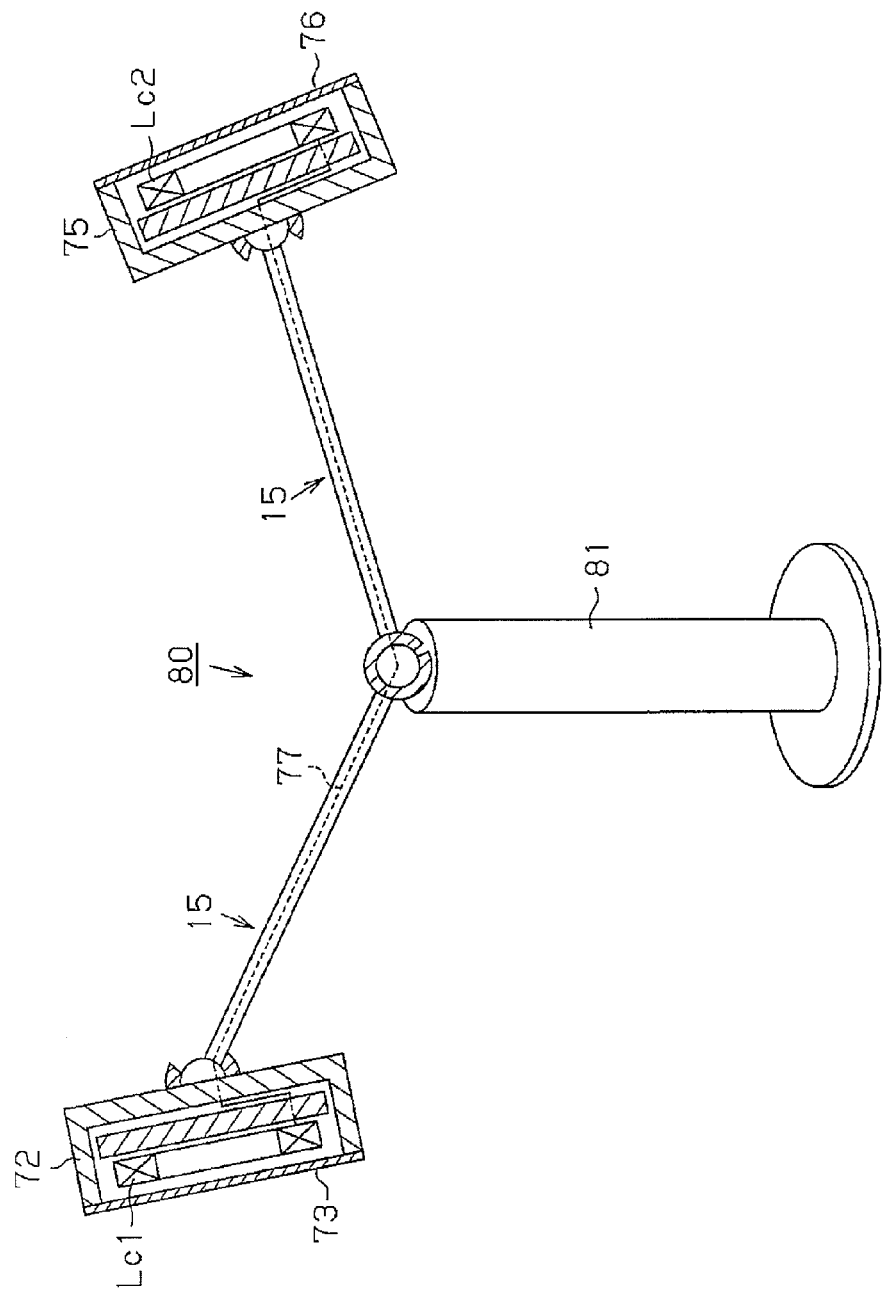

CONTACTLESS POWER SUPPLYING SYSTEM, ELECTRIC APPLIANCE, REPEATER, AND ADAPTOR

TECHNICAL FIELD

The present invention relates to a contactless power supplying system, an electric appliance, a repeater, and an adaptor.

BACKGROUND ART

In recent years, electric appliances, which are capable of receiving power in a contactless manner with high efficiency, have become practical (for example, Patent Document 1). For example, a primary coil of a contactless power supplying device is embedded in a flat structure such as a desk. When an electric appliance including a secondary coil is placed on the primary coil, the electric appliance can receive power. Further, by using a contactless adaptor including a secondary coil, the electric appliance can receive power through a connecting wire.

Patent Document 1: Japanese Laid-Open Patent Publication No. 2011-151900

SUMMARY OF THE INVENTION

There is no problem in the case of embedding the primary coil of the contactless power supplying device in the flat structure such as a desk. However, a problem occurs in the case of embedding the primary coil in a board vertically mounted with respect to a flat surface such as a desk. That is, the electric appliance including the secondary coil may not be arranged on the board that embeds the primary coil therein.

The contactless adaptor connected to the electric appliance through the connecting wire needs to be fixed to a vertical surface of a board or the like so as not to fall from the vertical surface due to self-weight of the contactless adaptor. However, when the adaptor is fixed with a separate means such as a magnet or a double-sided adhesive tape, attachment and detachment of the adaptor for repositioning is extremely burdensome. The magnet may absorb metal and induction-heats the metal. The double-sided adhesive tape or an adhesive deteriorates the appearance of the adaptor, and also obstructs cleaning.

Therefore, wireless power supplying has not satisfied power supplying in both of the cases where the electric appliance is placed on a flat surface and where the electric appliance receives power from a surface vertical to the flat surface.

An object of the present invention is to provide a contactless power supplying system, an electric appliance, a repeater, and an adaptor that, in contactless power supplying using electromagnetic induction, can spatially determine a position where the primary coil is magnetically connected to the secondary coil at any position in the gravity direction.

According to one aspect of the present invention, a contactless power supplying system includes a contactless power supplying device, which includes a high-frequency inverter configured to supply a high-frequency current and a primary coil configured to be supplied with the high-frequency current, an electric appliance, which includes a secondary coil configured to generate induced electromotive force based on alternating magnetic flux generated by the primary coil, and a power receiving circuit configured to supply the induced electromotive force generated by the secondary coil to a load, and a structure having a variable shape and adapted to be independently secured. At least one of a connecting wire configured to connect the primary coil to the high-frequency inverter, a connecting wire configured to connect the secondary coil to the power receiving circuit, and a connecting wire configured to connect the power receiving circuit to the load is arranged along the structure. The secondary coil is spatially positioned with respect to the primary coil depending on the shape of the structure.

In the above structure, it is preferred that the structure be an articulated flexible arm.

In the above structure, it is preferred that the structure be a bellows flexible arm.

In the above structure, it is preferred that the contactless power supplying system further include a repeater arranged between the primary coil and the secondary coil. The repeater includes a second structure, arranged on a support table, having a variable shape, and adapted to be independently secured, and an intermediate coil, supported via the second structure and configured to magnetically resonate with the alternating magnetic flux generated by the primary coil so that magnetic resonance of the intermediate coil causes the secondary coil to generate induced electromotive force to drive the electric appliance.

According to another aspect of the present invention, an electric appliance includes a secondary coil configured to generate induced electromotive force based on alternating magnetic flux generated by a primary coil of a contactless power supplying device, an accommodating case configured to accommodate the secondary coil, a power receiving circuit configured to supply the induced electromotive force generated by the secondary coil to a load, and a structure arranged between a device body of the electric appliance and the accommodating case, the structure having a variable shape and adapted to be independently secured.

In the above structure, the power receiving circuit may be arranged in the device body. Further, it is preferred that a connecting wire connecting the secondary coil arranged in the accommodating case to the power receiving circuit be arranged along the structure.

In the above structure, the power receiving circuit together with the secondary coil may be accommodated in the accommodating case. Further, it is preferred that a connecting wire connecting the load to the power receiving circuit be arranged along the structure.

In the above structure, it is preferred that the structure be an articulated flexible arm.

In the above structure, it is preferred that the structure be a bellows flexible arm.

In the above structure, it is preferred that the structure include a bottom end having a connector. It is preferred that the connector be attachable to a connector arranged in the device body.

In the above structure, it is preferred that the connector be a USB-applicable connector.

In the above structure, it is preferred that the electric appliance further include a magnetic body arranged in the rear of the secondary coil in the accommodating case.

In the above structure, it is preferred that the electric appliance further include a cover covering the accommodating case.

In the above structure, it is preferred that the cover have an accessory.

According to still another aspect of the present invention, a repeater is arranged between a contactless power supplying device including a primary coil and an electric appliance including a secondary coil. The repeater includes an intermediate coil configured to magnetically resonate with alternating magnetic flux generated by the primary coil so that magnetic resonance of the intermediate coil causes the secondary coil to generate induced electromotive force, an accommodating case configured to accommodate the intermediate coil, and a structure arranged between a support table and the accommodating case, the structure having a variable shape and adapted to be independently secured.

In the above structure, it is preferred that the repeater further include a resonant capacitor connected to the intermediate coil.

In the above structure, the accommodating case may be one of a plurality of accommodating cases supported by the support table via the structure. In this case, it is preferred that the intermediate coils accommodated in the accommodating cases form a resonant circuit.

In the above structure, it is preferred that the repeater further include a second structure having a variable shape and adapted to be independently secured, a second intermediate coil coupled to the accommodating case via the second structure and configured to form a resonant circuit together with the intermediate coil, and a second accommodating case configured to accommodate the second intermediate coil.

According to still another aspect of the present invention, an adaptor supplying power to an electric appliance includes a secondary coil configured to generate induced electromotive force based on alternating magnetic flux generated by a primary coil of a contactless power supplying device, an accommodating case configured to accommodate a secondary coil, a connector attachable to the electric appliance, a structure arranged between the accommodating case and the connector, the structure having a variable shape and adapted to be independently secured, and a connecting wire arranged along the structure, the connecting wire connecting the secondary coil to the connector.

In the above structure, the structure may be a bellows flexible arm. In this case, it is preferred that the connecting wire be arranged in the flexible arm.

In the above structure, it is preferred that the connector be a USB-applicable connector.

In the above structure, it is preferred that the adaptor further include a cover covering the accommodating case.

In the above structure, it is preferred that the cover have an accessory.

According to the present invention, a position where a primary coil is magnetically connected to a secondary coil may be spatially determined at any position in the gravity direction.

BRIEF DESCRIPTION OF THE DRAWINGS

FIG. 14A illustrates a contracted state, and FIG. 14B illustrates a extended state.

FIG. 16A is a perspective view illustrating the arrangement of audio equipment, and FIG. 16B is a side view illustrating the arrangement of the audio equipment.

FIG. 17A is a perspective view illustrating the arrangement of an electric appliance, and FIG. 17B is a side view illustrating the arrangement of the electric appliance.

FIG. 25 is a view illustrating a repeater in another example in the third embodiment.

DESCRIPTION OF THE EMBODIMENTS

[First Embodiment]

A first embodiment of a contactless power supplying system according to the present invention will now be described below with reference to figures.

Figure 1:
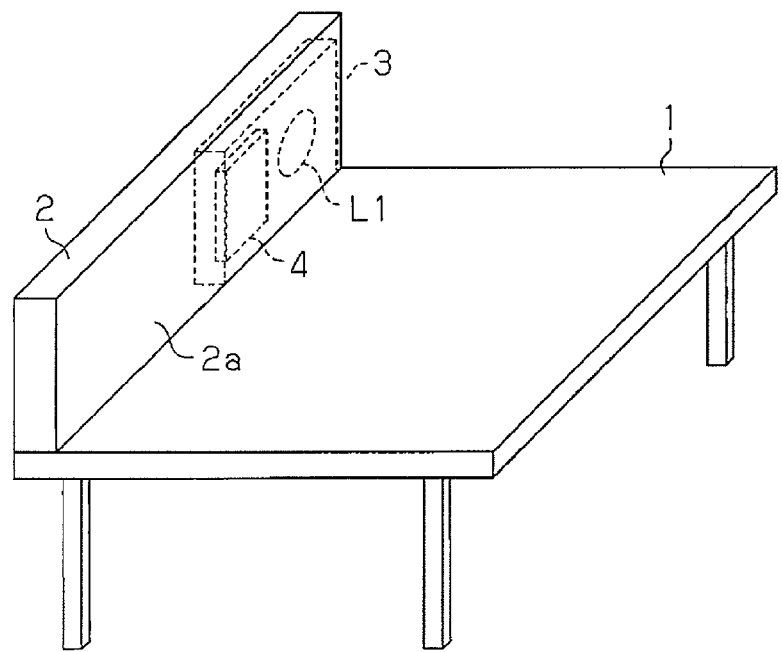
FIG. 1 is a perspective view of a desk including a contactless power supplying device of a contactless power supplying system in a first embodiment.

As illustrated in FIG. 1, a sideboard 2 is vertically fixed to the rear part of the upper surface of a desk 1. A contactless power supplying device (hereinafter referred to as power supplying device) 3 is fixedly accommodated in the sideboard 2. A primary coil L1 and a high-frequency inverter 4 for exciting the primary coil L1 are arranged in a housing of the power supplying device 3. The primary coil L1 arranged in the housing of the power supplying device 3 is arranged such that the coil surface faces the front side of the desk 1, that is, becomes parallel to a front surface 2a of the sideboard 2.

The power supplying device 3 has a power supply circuit (not illustrated), rectifies commercial power inputted from the outside, performs DC/DC conversion, drives the high-frequency inverter 4, and excites the primary coil L1. In the present embodiment, the high-frequency inverter 4 flows a several tens of kHz to several tens of MHz high-frequency current to the primary coil L1 so as to generate an alternating magnetic field in the primary coil L1. The alternating magnetic field generated by the primary coil L1 is emitted forward from the front surface 2a of the sideboard 2.

Figure 2:
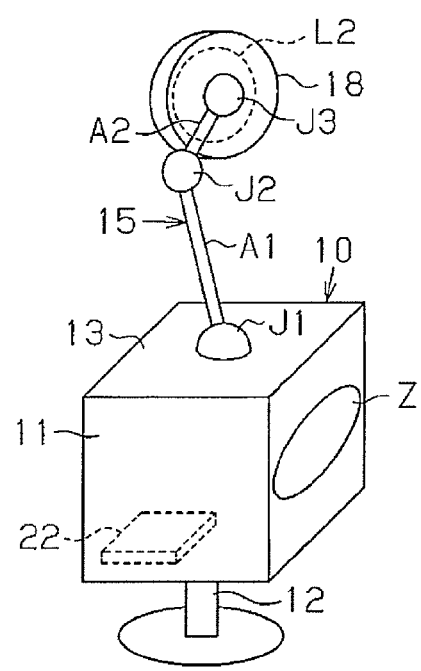
FIG. 2 is a perspective view of an electric appliance including a power receiving circuit of the contactless power supplying system.

As illustrated in FIG. 2, an electric appliance (an electrical lamp in the present embodiment) 10 for receiving secondary power from the power supplying device 3 has a leg 12 at a housing 11 (a device body of the electric appliance 10) so as to be deployable at any position of the desk 1. An accommodating case 18 that stores a secondary coil L2 for generating secondary power based on the alternating magnetic field from the primary coil L1 is arranged above an upper surface 13 of the housing 11 of the electric appliance 10 via a flexible arm 15.

Figure 3:
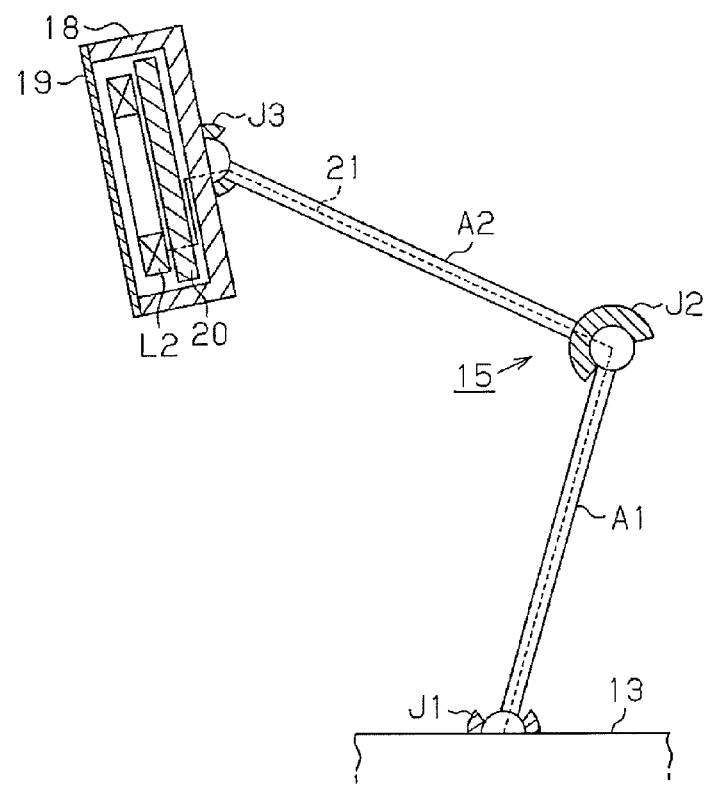
FIG. 3 is a view illustrating a flexible arm.

As illustrated in FIG. 3, the flexible arm 15 has a first arm A1, a second arm A2, a first universal joint J1, a second universal joint J2, and a third universal joint J3.

The bottom end of the first arm A1 is coupled to the first universal joint J1 arranged on the upper surface 13 of the housing 11. The first arm A1 is coupled to the first universal joint J1, thereby being pivotally supported by the first universal joint J1.

The first arm A1 is coupled to and supported by the first universal joint J1 such that the first arm A1 does not pivot about the first universal joint J1 and keeps its original state unless some force is applied to the first arm A1. That is, a sliding resistance between the first arm A1 and the first universal joint J1 is set such that the first arm A1 does not pivot about the first universal joint J1 and keeps its original state unless some force is applied thereto.

The front end of the first arm A1 is coupled to the bottom end of the second arm A2 via the second universal joint J2 attached to the front end of the first arm A1. The second arm A2 is coupled to the second universal joint J2, thereby being pivotally supported by the second universal joint J2.

The second arm A2 is coupled to and supported by the second universal joint J2 such that the second arm A2 does not pivot about the second universal joint J2 and keeps its original state unless some force is applied there the second arm A2. That is, a sliding resistance between the second arm A2 and the second universal joint J2 is set such that the second arm A2 does not pivot about the second universal joint J2 and keeps its original state unless some force is applied thereto.

The front end of the second arm A2 is coupled to the third universal joint J3 attached to the center of the back surface of the accommodating case 18. The third universal joint J3 is coupled to the second arm A2, resulting in that the accommodating case 18 is pivotally supported by the third universal joint J3 (the front end of the second arm A2).

The accommodating case 18 is coupled to and supported by the third universal joint J3 such that the accommodating case 18 does not pivot about the third universal joint J3 and keeps its original state unless some force is applied to the accommodating case 18. That is, a sliding resistance between the second arm A2 and the third universal joint J3 is set such that the accommodating case 18 does not pivot about the third universal joint J3 and keeps its original state unless some force is applied thereto.

Thus, the flexible arm 15 including the first arm A1, the second arm A2, the first universal joint J1, the second universal joint J2, and the third universal joint J3 is a structure that has a variable shape and is adapted to be independently secured. The first arm A1, the second arm A2, the first universal joint J1, the second universal joint J2, and the third universal joint J3, which form the flexible arm 15, may be made of metal or synthetic resin.

The accommodating case 18 has a case body made of metal or magnetic body, and its front opening is covered with a cover 19 made of a material capable of transmitting the alternating magnetic field. In the accommodating case 18, a secondary coil L2 is fixedly arranged, and a magnetic body 20 is fixedly arranged in the rear of the secondary coil L2. The secondary coil L2 is arranged in the accommodating case 18 such that its coil surface becomes parallel to the surface of the cover 19.

Thus, the surface of the cover 19 of the accommodating case 18 (that is, the coil surface of the secondary coil L2) may be oriented to a desired direction merely by applying a force to the accommodating case 18 in the desired direction and the state is kept.

This may cause the surface of the cover 19 of the accommodating case 18 (that is, the coil surface of the secondary coil L2) to be opposed to the coil surface of the primary coil L1 of the power supplying device 3 arranged in the sideboard 2. By exciting the primary coil L1 in the opposed state, the secondary coil L2 generates secondary power.

Figure 4A:
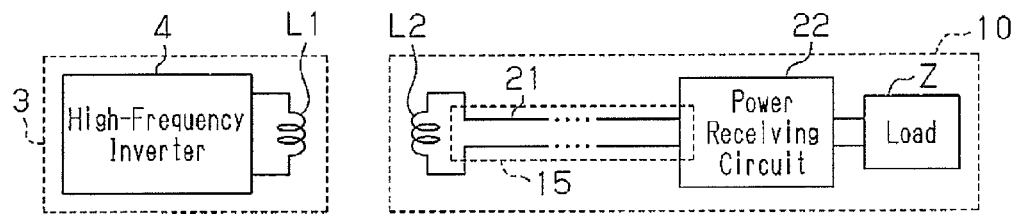
FIG. 4A is an electrical block circuit diagram illustrating electrical structure of the contactless power supplying system.

An winding end of the secondary coil L2 in the accommodating case 18 is connected to a connecting wire 21 (Refer to FIG. 4A), and the connecting wire 21 is guided into the housing 11 of the electric appliance 10 along the flexible arm 15 drawn from the back surface of the accommodating case 18.

For example, the first arm A1 and the second arm A2 each are a pipe-like arm in the present embodiment, and as represented by a broken line in FIG. 3, the connecting wire 21 is guided into the housing 11 through the pipes of the second arm A2 and the first arm A1. The connecting wire 21 guided into the housing 11 is connected to a power receiving circuit 22 illustrated in FIG. 2.

The power receiving circuit 22 includes a rectifier circuit, a DC/DC converter, and the like. The power receiving circuit 22 rectifies the secondary power generated by the secondary coil L2 in the rectifier circuit, converts the power into a predetermined DC voltage in the DC/DC converter, and supplies the DC voltage to a load Z such as an LED (a light emitting element) of the electric appliance (the electrical lamp), thereby allowing the load Z to emit light.

Next, an electrical structure of the power supplying device 3 and the electric appliance 10 will now be described with reference to FIG. 4.

In FIG. 4, the high-frequency inverter 4 of the power supplying device 3 is connected to the primary coil L1. When receiving driving power from a power supply circuit (not illustrated), the high-frequency inverter 4 excites the primary coil L1. The power receiving circuit 22 of the electric appliance 10 is connected to the secondary coil L2 in the accommodating case 18 via the connecting wire 21 arranged along the flexible arm 15. The power receiving circuit 22 converts the secondary power induced in the secondary coil L2 based on the alternating magnetic field generated by excitation of the primary coil L1 of the power supplying device 3 into a DC voltage. Subsequently, the power receiving circuit 22 DC/DC converts the DC voltage into a desired voltage and supplies the DC/DC converted DC voltage to the load Z of the electric appliance 10.

The load Z of the electric appliance 10 only needs to be an illuminant driven by secondary power generated by the secondary coil L2 and, for example, may be an illuminant that emits light with a DC/DC converted DC power or with the secondary power as AC power.

Figure 4B:
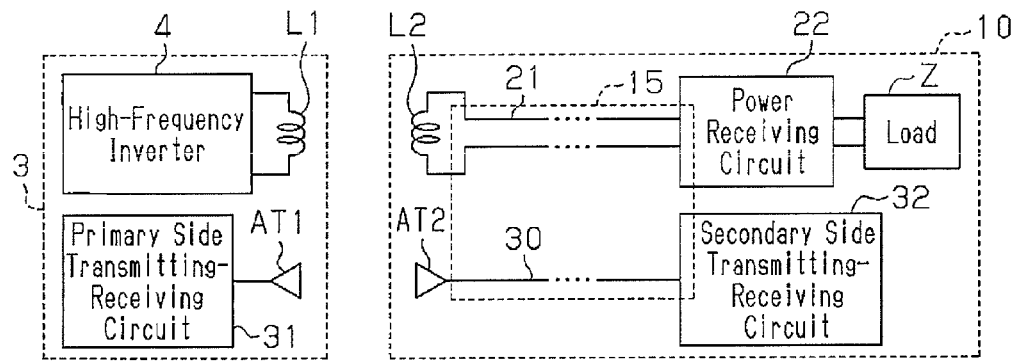
FIG. 4B is an electrical block circuit diagram illustrating another example of the electrical structure of the contactless power supplying system.

A transmitting-receiving primary antenna coil AT1 may be arranged in the vicinity of the primary coil L1 in the power supplying device 3, and a transmitting-receiving secondary antenna coil AT2 may be arranged in the vicinity of the secondary coil L2 in the accommodating case 18 (refer to FIG. 4B).

In this case, the primary antenna coil AT1 is connected to a primary side transmitting-receiving circuit 31 in the power supplying device 3. The secondary antenna coil AT2 is connected to a signal line 30, and the signal line 30 is connected to a secondary side transmitting-receiving circuit 32 in the housing 11 along the flexible arm 15.

FIG. 4B illustrates an electrical circuit in this case. The power supplying device 3 and the electric appliance 10 have communication functions, and by using the flexible arm 15, the secondary antenna coil AT2 for communication may be arranged in the vicinity of the primary antenna coil AT1. As a result, detailed control and information communication for power supplying may be achieved without losing the above-described convenience.

Next, the operation of the contactless power supplying system will now be described.

Figure 5:
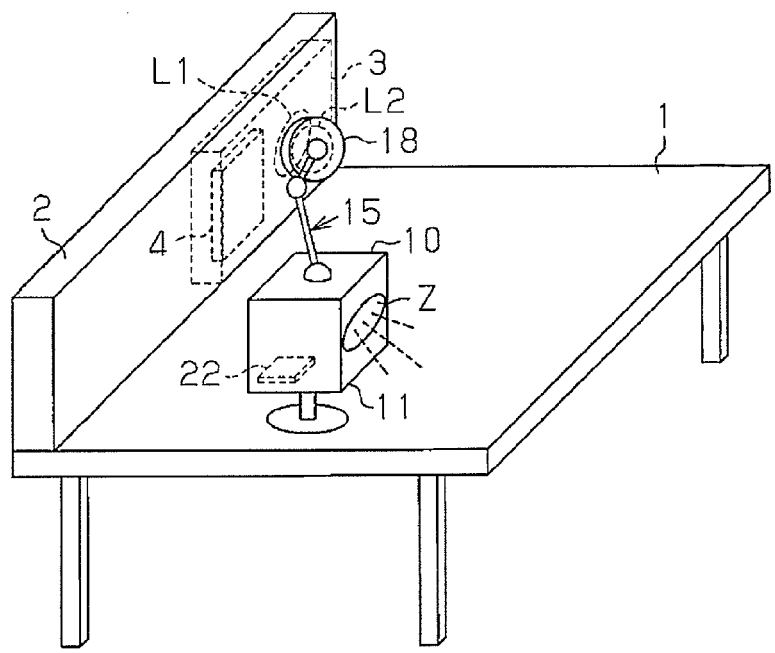
FIG. 5 is a perspective view illustrating the operation of the first embodiment.

When the electric appliance 10 is arranged in the left part of the desk 1 as illustrated in FIG. 5, the electric appliance 10 (housing 11) is located away from the coil surface of the primary coil L1 of the power supplying device 3 arranged in the sideboard 2.

Next, to cause the surface of the cover 19 of the accommodating case 18 accommodating the secondary coil L2 to be opposed to the primary coil L1 of the power supplying device 3 arranged in the sideboard 2, the accommodating case 18 coupled to the housing 11 via the flexible arm 15 is oriented to the coil surface of the primary coil L1. That is, the accommodating case 18 is guided with a hand such that the surface of the cover 19 of the accommodating case 18 is opposed to the coil surface of the primary coil L1.

In this case, the first arm A1 and the second arm A2 of the flexible arm 15 are freely pivotable and the accommodating case 18 is freely pivotable about the third universal joint J3 (the front end of the second arm A2). Thus, the surface of the cover 19 of the accommodating case (the coil surface of the secondary coil L2) may be opposed to the coil surface of the primary coil L1 of the power supplying device 3 and the state is kept.

When the high-frequency inverter 4 is driven to excite the primary coil L1 in this state, the secondary coil L2 accommodated in the opposed accommodating case 18 generates secondary power. The secondary power generated by the secondary coil L2 is supplied to the power receiving circuit 22 of the electric appliance 10 via the connecting wire 21. The power receiving circuit 22 rectifies the secondary power, converts the rectified power into a desired DC voltage, and supplies the DC voltage to the load Z, thereby allowing the load Z to emit light.

Figure 6:
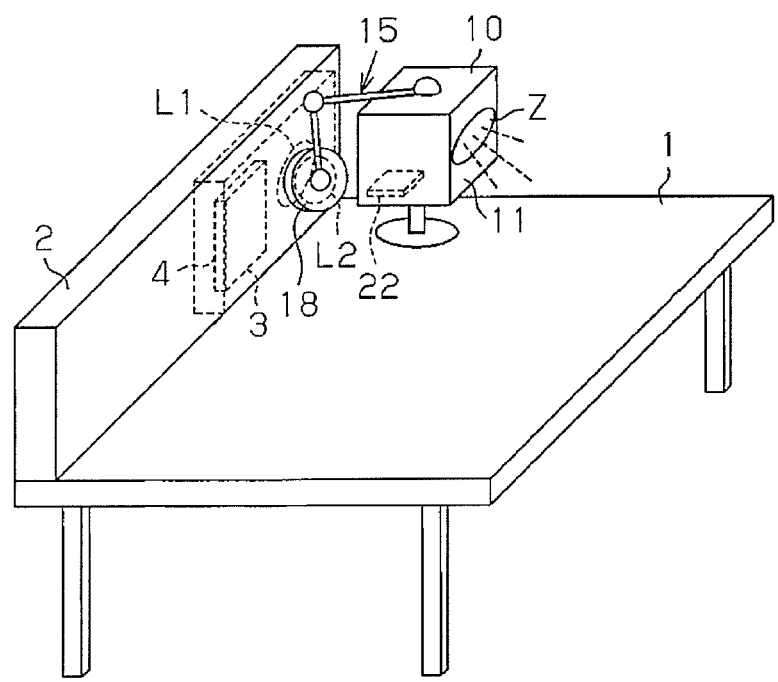
FIG. 6 is a perspective view illustrating the operation of the first embodiment.

When the electric appliance 10 is arranged in the right part of the desk 1 as illustrated in FIG. 6, the electric appliance 10 (housing 11) is located away from the coil surface of the primary coil L1 of the power supplying device 3 arranged in the sideboard 2.

Similarly in this case, the accommodating case 18 is guided from the separated position with a hand such that the surface of the cover 19 of the accommodating case 18 is opposed to the coil surface of the primary coil L1. Thus, as illustrated in FIG. 6, the surface of the cover 19 of the accommodating case 18 (the coil surface of the secondary coil L2) may be opposed to the coil surface of the primary coil L1 of the power supplying device 3 and the state is kept.

When the primary coil L1 is excited in this state, the secondary coil L2 accommodated in the opposed accommodating case 18 generates secondary power, and the secondary power generated by the secondary coil L2 is supplied to the power receiving circuit 22 of the electric appliance 10 via the connecting wire 21. Then, the power receiving circuit 22 rectifies the secondary power, converts the rectified power into a desired DC voltage, and supplies the DC voltage to the load Z, thereby allowing the load Z to emit light.

That is, the electric appliance 10 may receive power from the power supplying device 3 at any position of the desk 1 to illuminate the desk 1.

The first embodiment has the following advantages.

(1) In the electric appliance 10, the accommodating case 18, which stores the secondary coil L2 that generates secondary power through excitation of the primary coil L1, is pivotably coupled to the housing 11 via the flexible arm 15 so that the state is kept.

Thus, the secondary coil L2 may be oriented in a desired direction by use of the flexible arm 15 merely by applying a force to the accommodating case 18 in the desired direction and the state is kept. That is, the position at which the primary coil L1 is magnetically connected to the secondary coil L2 may be spatially determined at any position in the gravity direction. As a result, even when the power supplying device 3 is oriented to any direction and the electric appliance 10 is located at any position of the desk 1, the electric appliance 10 may receive power from the power supplying device 3 to illuminate the desk 1.

(2) The accommodating case 18 accommodating the secondary coil L2, except for the cover 19 formed on the opening, is formed of metal or magnetic body. Therefore, an electromagnetic wave generated from the secondary coil L2 at power reception may be prevented from being emitted to the outside.

(3) Since a magnetic body 20 is accommodated in the rear of the secondary coil L2 in the accommodating case 18, leakage flux is reduced, and magnetic coupling with the primary coil L1 is improved. This achieves efficient power supply from the primary coil L1.

(4) The connecting wire 21 electrically connecting the secondary coil L2 to the power receiving circuit 22 is guided into the housing 11 through the pipes of the first arm A1 and the second arm A2. Since the connecting wire 21 is invisible from the outside, the electric appliance 10 has an excellent design, and the outer appearance on the desk 1 does not deteriorate.

The first embodiment may be modified as follows.

In the first embodiment, the primary coil L1 and the secondary coil L2 are circular and however, the coils may have any shape such as rectangle.

In the first embodiment, the flexible arm 15 is formed by the two arms, that is, the first arm A1 and the second arm A2. However, the flexible arm 15 is not limited to this structure and may be an articulated flexible arm including three or more arms.

Of course, the flexible arm 15 may be formed by a single arm. In this case, the bottom end of the arm may be coupled to the upper surface 13 of the housing 11 with a universal joint, and the front end of the arm may be coupled to the center of the back surface of the accommodating case 18 with a universal joint.

In the first embodiment, the connecting wire 21 is guided into the housing 11 through the pipes of the first arm A1 and the second arm A2. However, the connecting wire 21 may be guided into the housing 11 while being wound around the outer side surface of the flexible arm 15.

Figure 7:
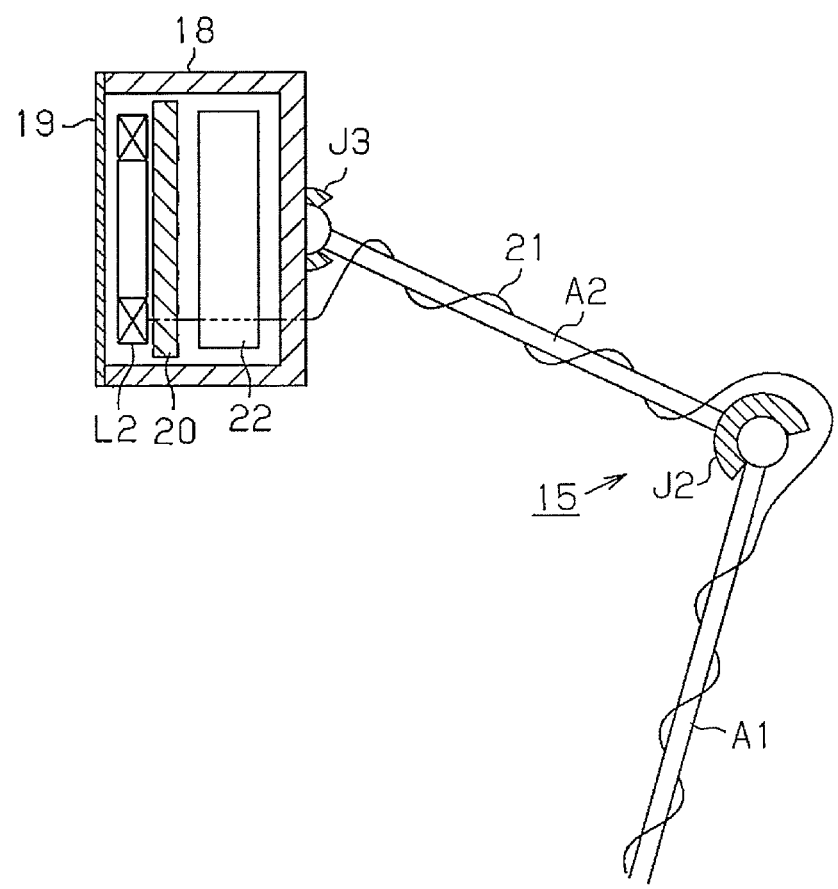
FIG. 7 is a sectional view of an accommodating case in which a power receiving circuit is arranged in another example of the first embodiment.

In the first embodiment, the secondary coil L2 and the magnetic body 20 are accommodated in the accommodating case 18. Alternatively, as illustrated in FIG. 7, the power receiving circuit 22 in the first embodiment may be accommodated in the accommodating case 18. In this case, a wire that is drawn from the power receiving circuit 22 and supplies a DC voltage to the load Z of the electric appliance 10 becomes the connecting wire 21. The load Z is driven with the DC voltage supplied through the connecting wire 21.

In FIG. 7, the connecting wire 21 is guided into the housing 11 while being wound around the outer side surface of the flexible arm 15. However, the connecting wire 21 may be guided into the housing 11 through the pipes of the first arm A1 and the second arm A2.

In the first embodiment, the flexible arm 15 is formed by the first arm A1, the second arm A2, the first universal joint J1, the second universal joint J2, and the third universal joint J3. That is, the flexible arm 15 is an articulated flexible arm including the arms.

Figure 8:
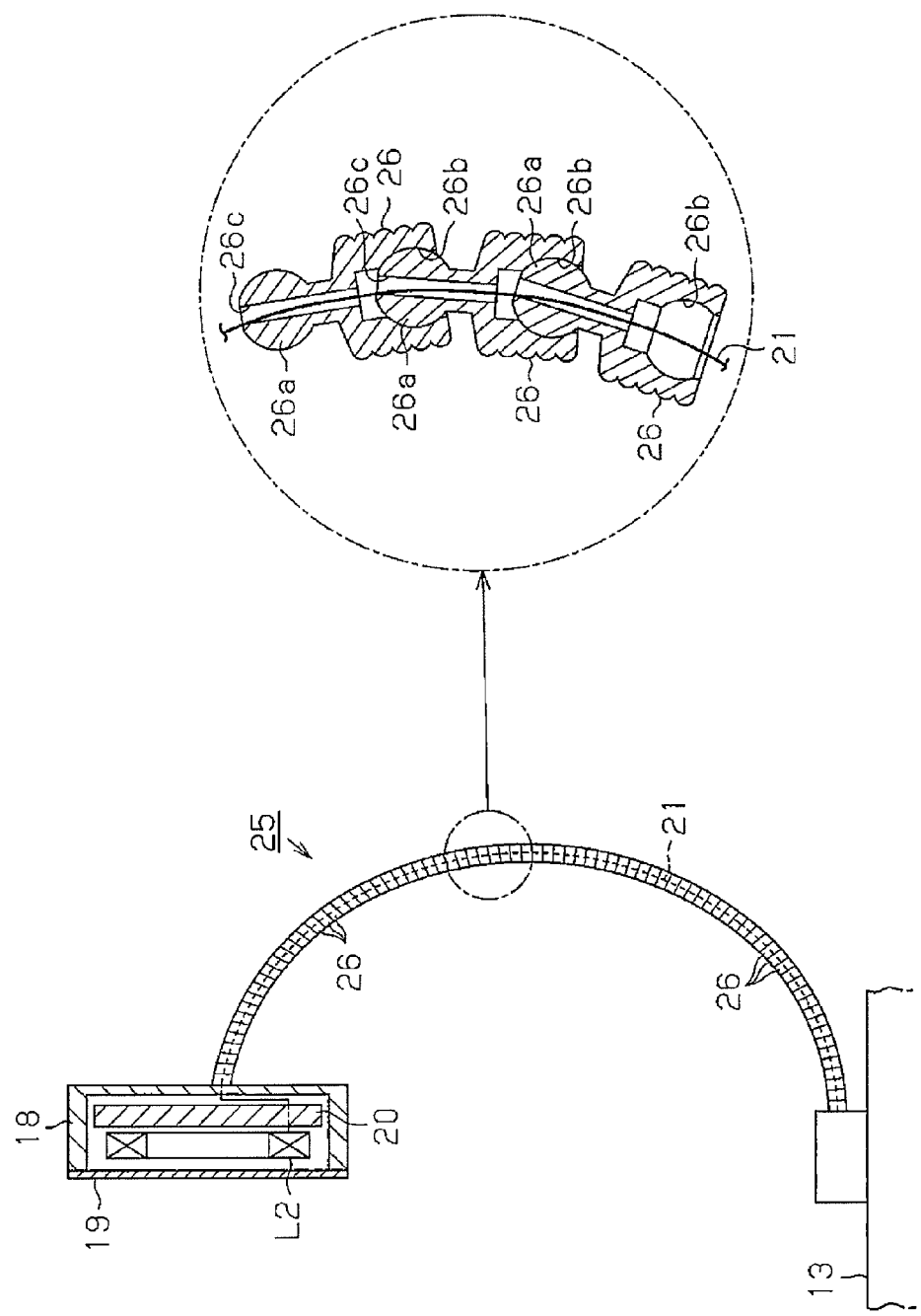
FIG. 8 is a view illustrating a bellows flexible arm in another example of the first embodiment.

Alternatively, as illustrated in FIG. 8, the flexible arm may be a bellows flexible arm 25. The bellows flexible arm 25 includes connecting members 26 that are continuously connected to each other. The connecting members 26 each have the same shape and are made of metal or synthetic resin.

As illustrated in FIG. 8, each of the connecting members 26 that form the flexible arm 25 has a ball 26a at one end and a spherical recess 26b at the other end. The connecting members 26 are coupled to each other by sequentially fitting the ball 26a of each connecting member 26 into the recess 26b of the adjacent connecting member 26 so as to form the bellows flexible arm 25.

The inner circumferential surface of the recess 26b and the outer circumferential surface of the fitted ball 26a are slidable with respect to each other. A sliding resistance is present between the inner circumferential surface of the recess 26b and the outer circumferential surface of the ball 26a. The sliding resistance is set such that the connecting members 26 do not rotate with respect to each other and its state is kept unless some force is applied thereto.

Thus, the bellows flexible arm 25 formed by the connecting members 26 is also a structure that has a variable shape and is adapted to be independently secured.

A through hole 26c axially extends through the ball 26a of each connecting member 26. The connecting wire 21 is passed through the through holes 26c to prevent the connecting wire 21 from being visible from the outside.

As illustrated in FIG. 8, the bottom end of the bellows flexible arm 25 is fixedly coupled to the upper surface 13 of the housing 11 of the electric appliance 10, and the front end of the bellows flexible arm 25 is fixedly coupled to the center of the back surface of the accommodating case 18.

Thus, the accommodating case 18 (the coil surface of the secondary coil L2) may be oriented to a desired direction merely by applying a force to the accommodating case 18 in the desired direction and the state is kept.

Figure 9:
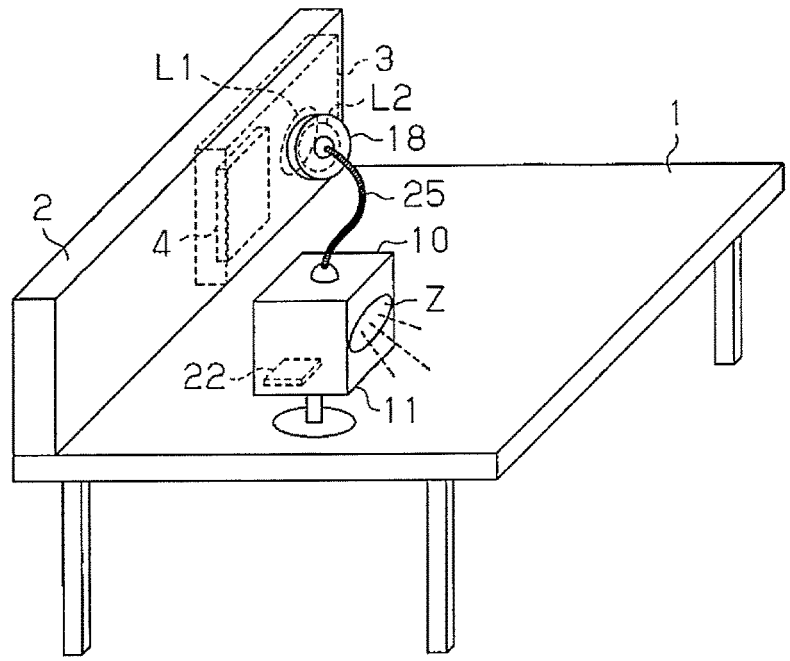
FIG. 9 is a perspective view illustrating the operation of the bellows flexible arm.
Figure 10:
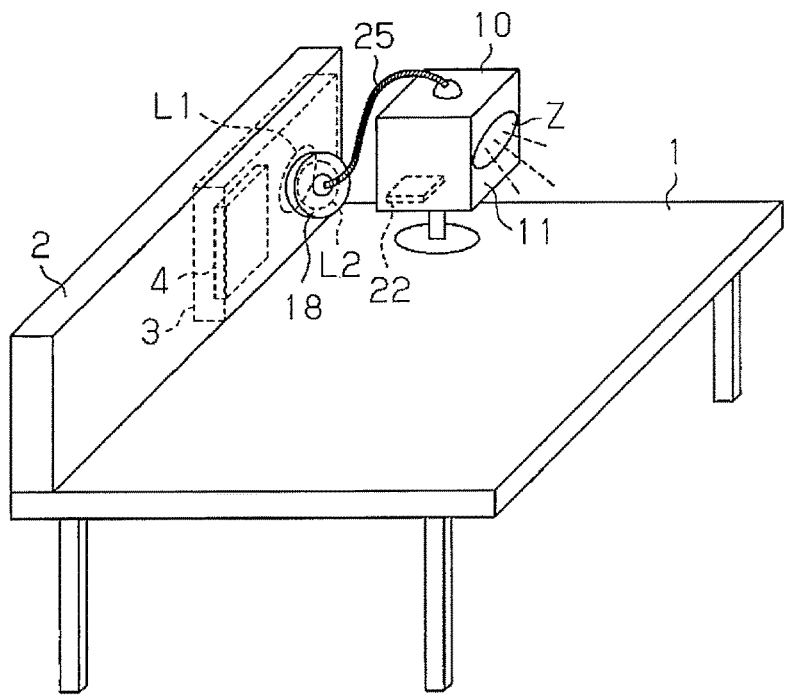
FIG. 10 is a perspective view illustrating the operation of the bellows flexible arm.

Accordingly, in the same manner as the first embodiment, as illustrated in FIG. 9 and FIG. 10, the coil surface of the secondary coil L2 of the electric appliance 10 (that is, the accommodating case 18) may be opposed to the primary coil L1 of the power supplying device 3 arranged in the sideboard 2. In this state, by exciting the primary coil L1 in this state, the secondary coil L2 generates secondary power.

In the bellows flexible arm 25 illustrated in FIG. 8, the connecting wire 21 is passed through the flexible arm 25. However, a bellows flexible arm having no through hole 26c may be adopted. In this case, the connecting wire 21 is guided into the housing 11 while being around the outer side surface of the flexible arm 25.

Figure 11:
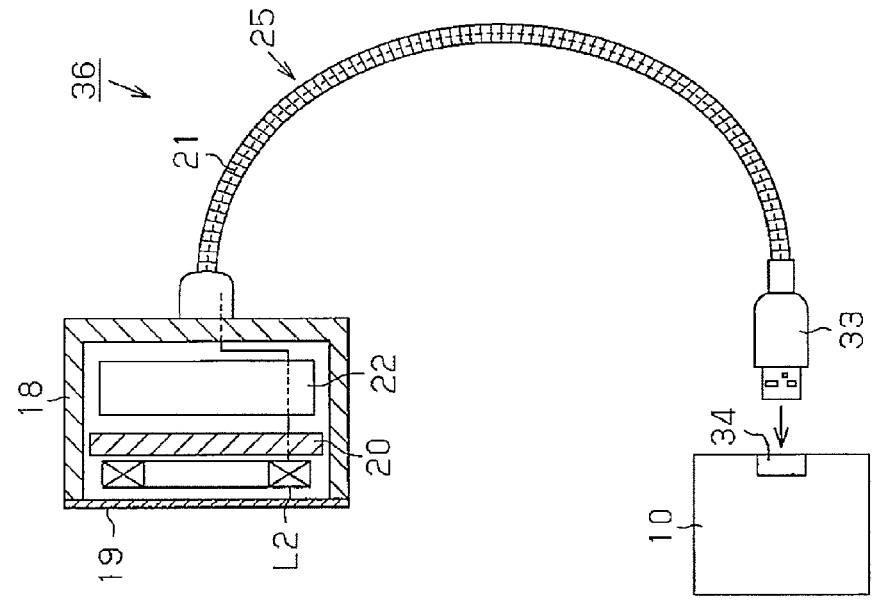
FIG. 11 is a view illustrating another example of the bellows flexible arm.

The bottom end of the bellows flexible arm 25 is fixedly coupled to the upper surface 13 of the housing 11 of the electric appliance 10. Alternatively, as illustrated in FIG. 11, a USB (Universal Serial Bus)-applicable connector 33 may be coupled to the bottom end of the bellows flexible arm 25. The connecting wire 21 may be connected to a predetermined terminal of the USB-applicable connector 33 to act as an electrical supply adaptor 36.

Thus, the commercially available electric appliance 10 provided with a USB connector 34 may be freely attached to the connector 33 to receive power.

Figure 12:
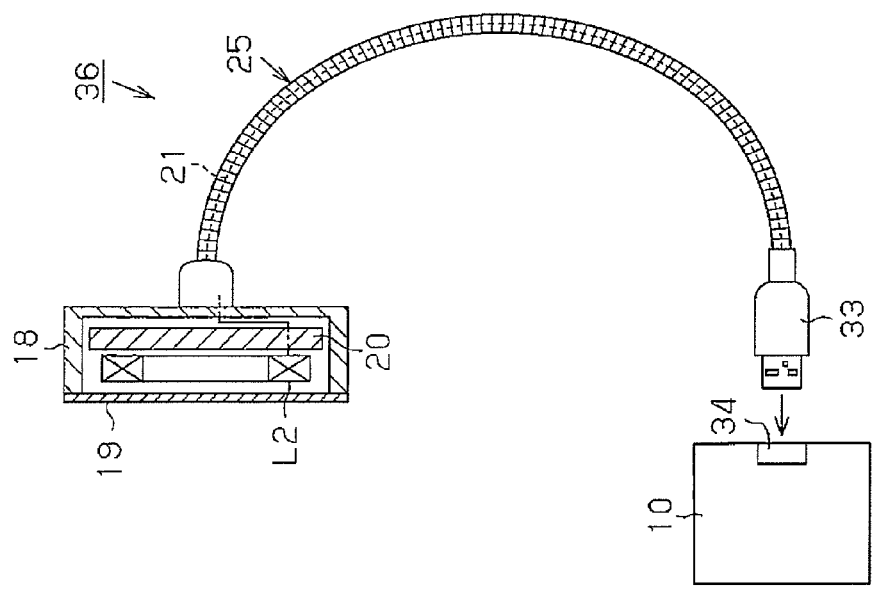
FIG. 12 is a view illustrating another example of the bellows flexible arm.

As illustrated in FIG. 12, the bellows flexible arm 25 provided with the USB-applicable connector 33 may be applied to the electrical supply adaptor 36 coupled to the accommodating case 18 accommodating the secondary coil L2, the magnetic body 20, and the power receiving circuit 22.

Figure 13:
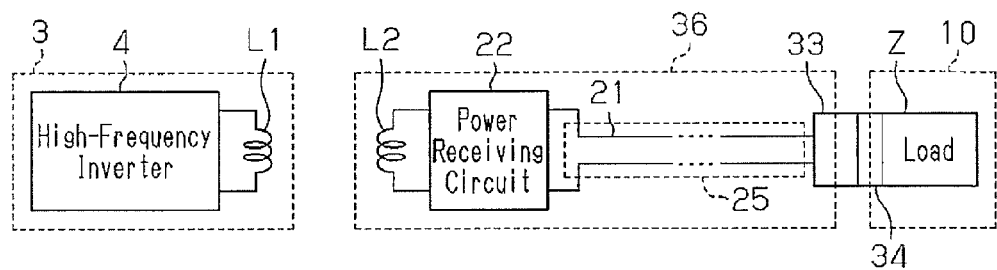
FIG. 13 is an electrical block circuit diagram illustrating the electrical structure of the contactless power supplying system.

Similarly, any commercially available electric appliance 10 provided with the USB connector 34 may be attached to receive power. FIG. 13 illustrates an electrical circuit in this state.

Of course, the bottom end of the bellows flexible arm 25 may be coupled to a normal electrical supply connector, not to the USB-applicable connector 33.

Figure 14B:
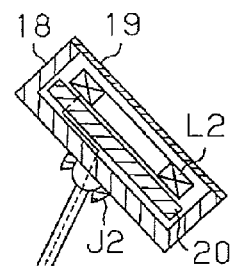
FIGS. 14A and 14B are views for illustrating an extendable flexible arm in another example of the first embodiment, where
Figure 14A:
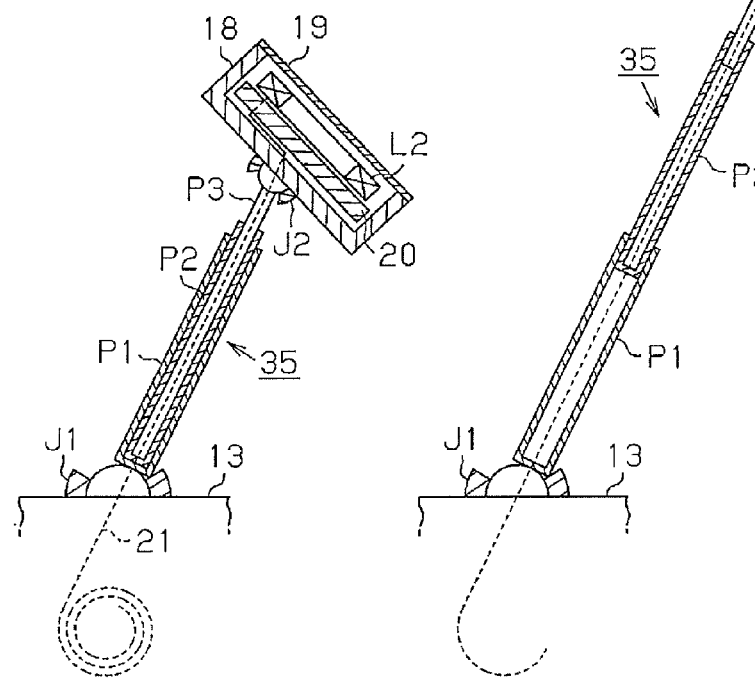

As illustrated in FIGS. 14A and 14B, other than the flexible arms 15 and 25, a flexible arm 35 may be formed by a plurality of telescopic pipes P1, P2, and P3 and the universal joints J1 and J2.

The flexible arm 35 has the telescopic pipes P1, P2, and P3 in decreasing order of diameter to achieve an extendable structure. The bottom end of the telescopic pipe P1 having the largest diameter is coupled to the upper surface 13 of the housing 11 via the first universal joint J1. The front end of the telescopic pipe P3 having the smallest diameter is coupled to the accommodating case 18 via the second universal joint J2.

In this case, a sliding resistance between the telescopic pipes P1, P2, and P3 during the extending/contracting operation is set such that the pipes do not extend or contact and keeps its original state unless some force is applied thereto. Similarly, a sliding resistance between the telescopic pipe P1 and the first universal joint J1 is set such that the telescopic pipe P1 does not pivot about the first universal joint J1 and keeps its original state unless some force is applied thereto. Further, a sliding resistance between the second universal joint J2 and the front of the telescopic pipe P3 is set such that the accommodating case 18 does not pivot about the second universal joint J2 and keeps its original state unless some force is applied thereto.

Thus, merely by extracting or contracting the telescopic pipe P1 to P3 and applying a force to the accommodating case 18 in a desired direction, the surface of the cover 19 of the accommodating case 18 may be oriented in the desired direction and furthermore the state is kept. By exciting the primary coil L1 in the opposed state, the secondary coil L2 generates secondary power.

When the flexible arm 35 contracts, the connecting wire 21 arranged in the telescopic pipes P1 to P3 is reeled off in the housing 11. On the contrary, when the flexible arm 35 extends, the connecting wire 21 wound in the telescopic pipes P1 to P3 is wound off.

Other than the flexible arms 15 and 25, a flexible arm that has a variable shape and adapted to be independently secured may be embodied using a pantograph-type link mechanism.

Other than the flexible arms 15 and 25, a bellows flexible arm that has a variable shape and is adapted to be independently secured may be embodied by helically winding a band-like metal plate into a cylindrical shape.

In the embodiment, one primary coil L1 supplies power to one electric appliance (electrical lamp) 10 but may supply power to the plurality of electric appliances 10.

Of course, the electric appliance 10 may be applied to various electric appliances such as a fan, a television, a radio, audio equipment, a toaster, a battery charger, in addition to lighting devices.

Figure 15:
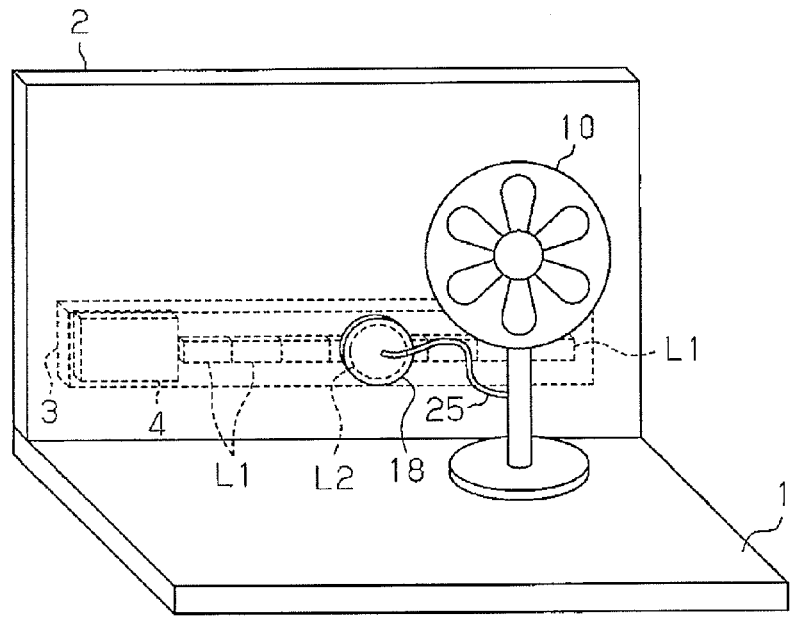
FIG. 15 is a view illustrating a contactless power supplying system in another example of the first embodiment.

In the embodiment, one primary coil L1 is arranged in the power supplying device 3 in the sideboard 2. Alternatively, as illustrated in FIG. 15, a plurality of primary coils L1 may be arranged in the sideboard 2, and the high-frequency inverters 4 exciting the respective primary coils L1 may be arranged in the power supplying device 3.

In this case, the degree of freedom in arrangement of the electric appliance 10 is further increased so as not to deteriorate the outer appearance of the device.

Figures 16A, 16B:
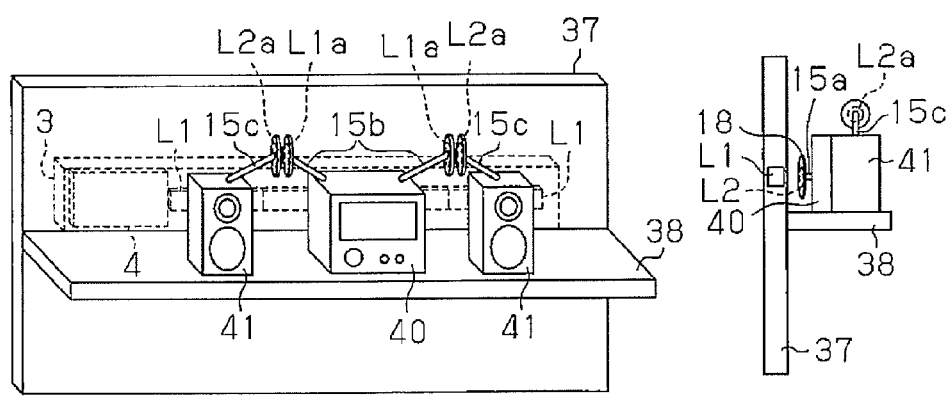
FIGS. 16A and 16B are views illustrating another example of the first embodiment, where

As illustrated in FIGS. 16A and 16B, the plurality of primary coils L1 may be arranged in a room wall 37, and the high-frequency inverters 4 exciting the respective primary coils L1 may be arranged in the power supplying device 3.

In this case, for example, an audio device body 40 such as an amplifier or a tuner is mounted at the center a shelf 38 arranged on the wall 37 as opposed to the primary coil L1 in the wall surface, and a speaker 41 is arranged on each side of the audio device body 40.

As illustrated in FIG. 16B, the secondary coil L2 extending from the back surface of the audio device body 40 via an articulated first flexible arm 15a is made opposed to the primary coil L1. The audio device body 40 uses power received by the secondary coil L2 at an internal power receiving circuit (not illustrated) to drive the audio device body 40.

Using the power received by the secondary coil L2, a high-frequency inverter (not illustrated) arranged in the audio device body 40 generates a high-frequency alternating current. The high-frequency inverter is connected to an audio-side primary coil L1a arranged at an articulated second flexible arm 15b extending from the upper surface of the audio device body 40 through the connecting wire (not illustrated). The high-frequency inverter excites the audio-side primary coil L1a through the connecting wire arranged along the second flexible arm 15b.

In each of the speakers 41, a speaker-side secondary coil L2a arranged at the front end of an articulated third flexible arm 15c extending from the upper surface of the speaker 41 is made opposite to the audio-side primary coil L1a.

In this case, the audio-side primary coil L1a may be fixedly coupled to the speaker-side secondary coil L2a by means of a magnet or an adhesive tape. The coil surface of the audio-side primary coil L1a may be made orthogonal to the coil surface of the speaker-side secondary coil L2a to magnetically connect the audio-side primary coil L1a to the speaker-side secondary coil L2a.

Thus, power and an audio signal are supplied from the audio device body 40 to the speakers 41 in a contactless codeless manner without deteriorating the outer appearance.

The audio signal may be a separate wireless signal transmitted via the antenna coils AT1 and AT2 illustrated in FIG. 4B, or a signal superimposing a power transmission magnetic flux. The second flexible arm 15b of the audio device body 40 may be omitted, and the audio-side primary coil L1a may be arranged on the inner side of the wall surface of the housing of the audio device body 40. Then, speaker-side secondary coil L2a may be opposed to the audio-side primary coil L1a via the third flexible arm 15c.

On the contrary, the third flexible arm 15c of the speaker 41 may be omitted, and the speaker-side secondary coil L2a may be arranged on the inner side of the wall surface of the housing of the speaker 41. The audio-side primary coil L1a may be made opposed to the speaker-side secondary coil L2a via the second flexible arm 15b.

The secondary coil L2 is coupled via the first flexible arm 15a from the audio device body 40. The first flexible arm 15a of the audio device body 40 may be omitted, and the secondary coil L2 may be arranged on the inner side of the wall surface of the housing of the audio device body 40. In this case, the audio device body 40 needs to be arranged such that the secondary coil L2 is opposed to the primary coil L1.

The first to third flexible arms 15a, 15b, and 15c are the articulated flexible arms and however, may be bellows flexible arms.

Figure 17A:
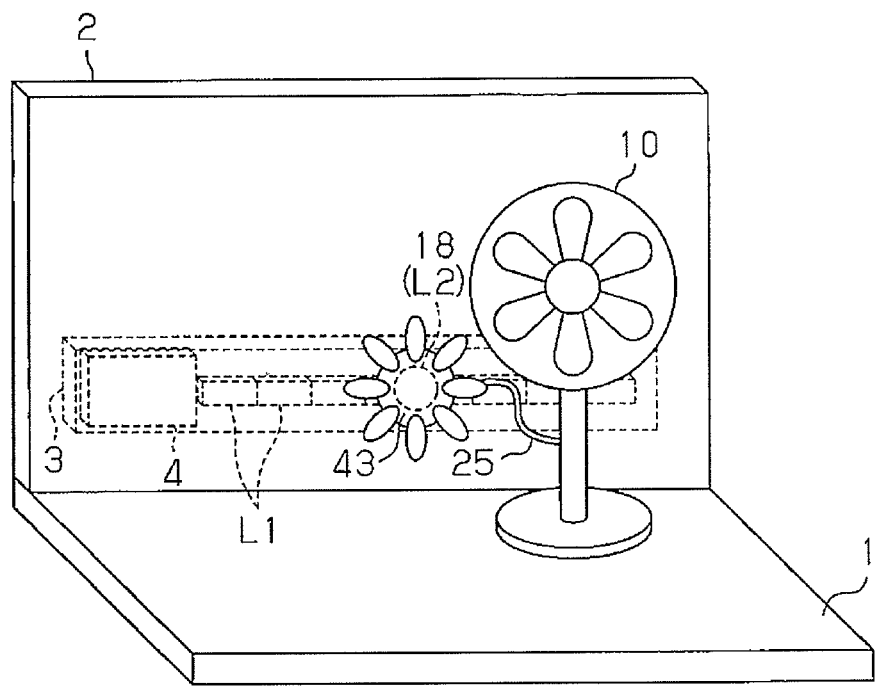
FIGS. 17A and 17B are views illustrating another example of the first embodiment, where
Figure 17B:
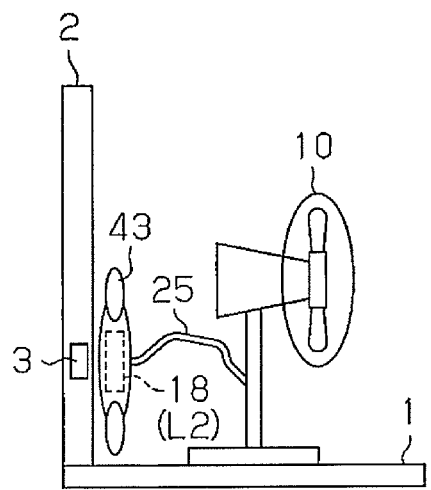

In the above embodiment, the accommodating case 18 is exposed. Alternatively, as illustrated in FIGS. 17A and 17B, the accommodating case 18 accommodating the secondary coil L2 may be covered with a cover 43 with an applique. In this structure, the accommodating case 18 acts as an accessory which improves the aesthetic design. The accessory may be realized by utilizing the structure that has a variable shape and is adapted to be independently secured in space, enabling characteristic direction of life space by using the contactless effect.

The cover 43 may be detachable and thus, may be changed in contents according to season. Of course, the cover 43 may be fixed to the accommodating case 18. The cover 43 may not have an accessory.

The accommodating case 18 of the adaptor 36 in FIGS. 11 and 12 may be covered with the cover 43.

In the above embodiment, an indicator indicating the position of the primary coil L1 of the power supplying device 3 is not displayed on the sideboard 2. However, the indicator indicating the position of the primary coil L1 may be displayed on the front surface 2a of the sideboard 2. According to this structure, the position of the primary coil L1 of the power supplying device 3 may be rapidly recognized, and the secondary coil L2 may be made opposed to the primary coil L1 accurately and reliably.

The indicator indicating the position of the primary coil L1 may be a picture or a photograph that appear as a three-dimensional image. This may present the position of the primary coil L1 with a sense of greater depth, enabling direction of the contactless and long gap spatial power supplying. Of course, a picture or a photograph that appear as a three-dimensional image may be stuck to the cover 43 covering the accommodating case 18 accommodating the secondary coil L2 in FIGS. 17A and 17B to create a sense of greater depth.

[Second Embodiment]

A second embodiment of the present invention will now be described.

In the second embodiment, the power supplying device 3, which serves as a first contactless power supplying device and supplies power to the electric appliance 10 in a contactless manner, is arranged on the desk 1, and the power supplying device 3 receives power from a second contactless power supplying device arranged at a place other than the desk 1 in a contactless manner.

Figure 18:
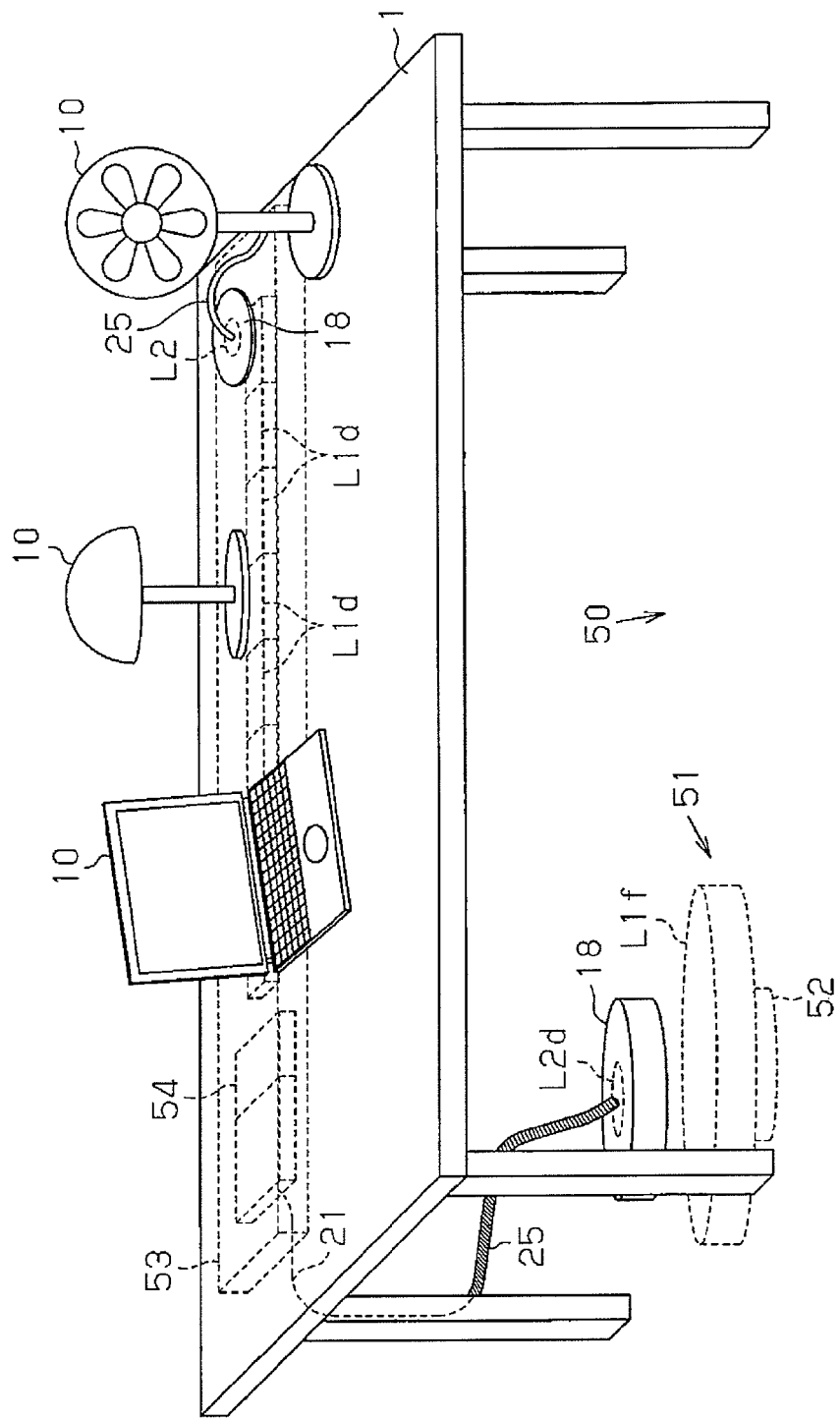
FIG. 18 is a perspective view illustrating a contactless power supplying system in a second embodiment

As illustrated in FIG. 18, a floor-side power supplying device 51 that serves as a second contactless power supplying device is fixed to a floor 50 on which the desk 1 is placed. A floor-side primary coil L1$f$ and a floor-side high-frequency inverter 52 exciting the floor-side primary coil L1$f$ are arranged in the housing of the floor-side power supplying device 51. The floor-side primary coil L1$f$ is arranged such that its coil surface faces the upper side of the floor 50, that is, becomes parallel to the floor surface. The floor-side power supplying device 51 has a power supply circuit (not illustrated), rectifies commercial power inputted from the outside, DC/DC converts the power, and drives the floor-side high-frequency inverter 52 to excite the floor-side primary coil L1$f$.

A desk-side power supplying device 53 that serves as the first contactless power supplying device is fixedly accommodated in the desk 1. A plurality of desk-side primary coils L1$d$ are aligned in the housing of the desk-side power supplying device 53 in the horizontal direction, and a desk-side high-frequency inverter 54 exciting each desk-side primary coil L1$d$ is arranged.

Each of the desk-side primary coils L1$d$ aligned in the horizontal direction is arranged such that its coil surface faces the upper side of the desk 1, that is, becomes parallel to the upper surface of the desk 1.

The desk-side power supplying device 53 has a power supply circuit (not illustrated), rectifies power inputted from the outside, DC/DC converts the power, and drives the desk-side high-frequency inverter 54 to excite the desk-side primary coils L1$d$.

The accommodating case 18 accommodating a desk-side secondary coil L2$d$ for receiving secondary power from the floor-side primary coil L1$f$ via the bellows flexible arm 25 using electromagnetic induction is arranged at a left corner of the lower surface of the desk 1.

Therefore, with the bellows flexible arm 25, the surface of the cover 19 of the accommodating case 18 (coil surface of the desk-side secondary coil L2$d$) may be directed in a desired direction merely by applying a force to the accommodating case 18 in the desired direction and furthermore the state is kept.

As a result, the surface of the cover 19 of the accommodating case 18 (coil surface of desk-side secondary coil L2$d$) may be made opposed to the coil surface of the floor-side primary coil L1$f$ of the floor-side power supplying device 51 arranged on the floor 50. By exciting the floor-side primary coil L1$f$ in the opposed state, the desk-side secondary coil L2$d$ generates secondary power.

The secondary power received by the desk-side secondary coil L2$d$ is outputted to the power supply circuit (not illustrated) of the desk-side power supplying device 53 through the connecting wire 21 arranged along the bellows flexible arm 25. Thereby, the power supply circuit of the desk-side power supplying device 53 rectifies power received by the desk-side secondary coil L2$d$, and DC/DC converts the power, and drives the desk-side high-frequency inverter 54 to excite the desk-side primary coils L1$d$.

Therefore, in the second embodiment, the degree of freedom in arrangement of the electric appliance 10 on the desk 1 may be increased as in the first embodiment. Further, the degree of freedom in arrangement of the electric appliance 10 on the desk 1 with respect to the floor 50 may be largely increased as well.

Moreover, each of the desk-side primary coils L1$d$ aligned in the horizontal direction is arranged such that its coil surface becomes parallel to the upper surface of the desk 1. Therefore, even the electric appliance 10 that has no flexible arms 15 and 25 and includes the secondary coil on the inner side of the back surface of the housing may be placed above the desk-side primary coils L1$d$ to receive power.

[Third Embodiment]

A third embodiment of the present invention will now be described.

In the third embodiment, a repeater is interposed between the power supplying device 3 and the electric appliance 10 receiving power from the power supplying device 3 such that the electric appliance 10 receives power from the power supplying device 3 via the repeater in a contactless manner.

Figure 19:
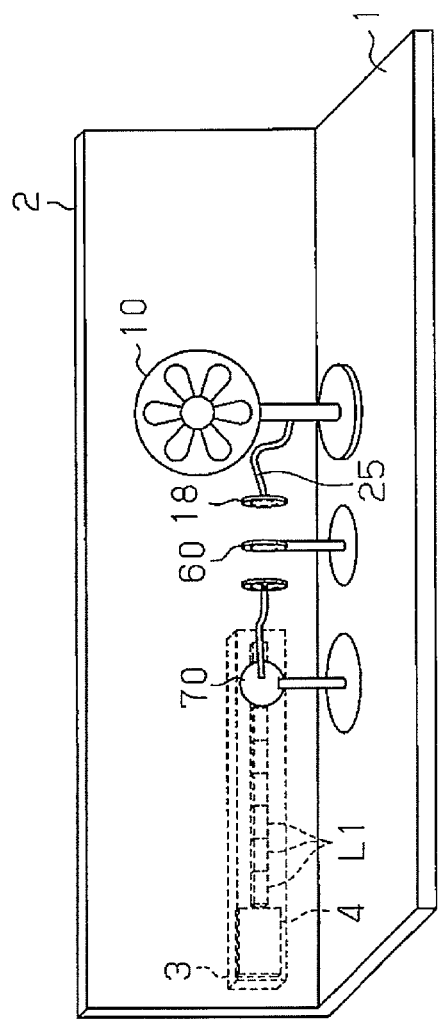
FIG. 19 is a perspective view illustrating a contactless power supplying system in a third embodiment.

As illustrated in FIG. 19, the electric appliance (fan in the present embodiment) 10 to which the accommodating case 18 accommodating the secondary coil L2 is coupled via the bellows flexible arm 25 is placed at a position beyond the reach of the primary coil L1 of the power supplying device 3.

In this case, the electric appliance 10 may not receive power from the primary coil L1 of the power supplying device 3.

Thus, in the third embodiment, the electric appliance 10 receives power from the power supplying device 3 in the contactless manner by using a first repeater 60 and a second repeater 70.

Figure 20:
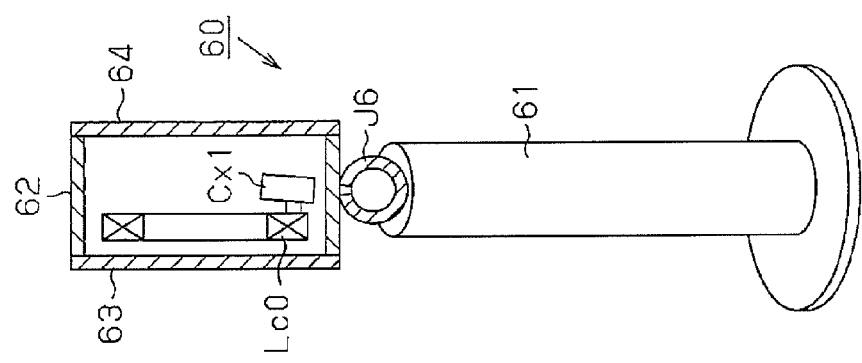
FIG. 20 is a view illustrating a first repeater.

As illustrated in FIG. 20, the first repeater 60 has a support table 61 placed on the desk 1, and the upper front end of the support table 61 is coupled to the outer circumferential surface of the lower end of a cylindrical accommodating case 62 via a universal joint J6. The accommodating case 62 is coupled to the universal joint J6, thereby being pivotally supported by the universal joint J6. However, the accommodating case 62 does not pivot about the universal joint J6 and keeps its original state unless some force is applied to the accommodating case 62.

That is, a sliding resistance between the accommodating case 62 and the universal joint J6 is set such that the accommodating case 62 does not pivot about the universal joint J6 and keeps its original state unless some force is applied the accommodating case 62. Thus, the universal joint J6 is a structure that has a variable shape and is adapted to be independently secured.

Openings of both sides of the cylindrical accommodating case 62 are covered with respective covers 63 and 64 made of a material that can transmit the alternating magnetic field. The accommodating case 62 stores an intermediate coil Lc0. The intermediate coil Lc0 is arranged such that its coil surface becomes parallel to the covers 63 and 64. The intermediate coil Lc0 is connected to a resonant capacitor Cx1. The coil Lc0 and the capacitor Cx1 form a first resonant circuit.

Figure 21:
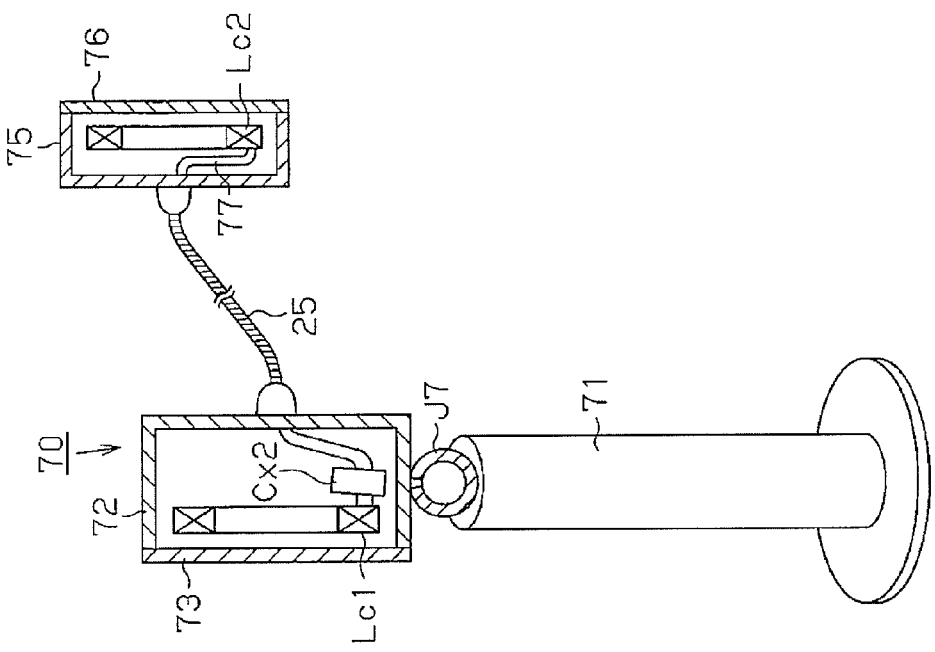
FIG. 21 is a view illustrating a second repeater.

As illustrated in FIG. 21, a second repeater 70 has a support table 71 placed on the desk 1 and a first accommodating case 72.

The upper front end of the support table 71 is coupled to the outer circumferential surface of the lower end of the first accommodating case 72 via a universal joint J7. The first accommodating case 72 is coupled to the universal joint J7, thereby being pivotally supported by the universal joint J7. However, the first accommodating case 72 does not pivot about the universal joint J7 and keeps its original state unless some force is applied to the first accommodating case 72.

That is, a sliding resistance between the first accommodating case 72 and the universal joint J7 is set such that the first accommodating case 72 does not pivot about the universal joint J7 and keeps its original state unless some force is applied to the first accommodating case 72. Thus, the universal joint J7 is a structure that has a variable shape and is adapted to be independently secured.

The first accommodating case 72 stores a first intermediate coil Lc1, and an opening of the front surface is covered with a cover 73 made of a material that may transmit the alternating magnetic field. The first intermediate coil Lc1 is arranged such that its coil surface becomes parallel to the cover 73.

The bellows flexible arm 25 is arranged at the center of the back surface of the first accommodating case 72, and a second accommodating case 75 is attached to the front end of the flexible arm 25. The second accommodating case 75 stores a second intermediate coil Lc2, and its opening of the front surface is covered with a cover 76 made of a material that can transmit the alternating magnetic field. The second intermediate coil Lc2 is connected to the first intermediate coil Lc1 accommodated in the first accommodating case 72 through a connecting wire 77. The connecting wire 77 connects the first intermediate coil Lc1 to the second intermediate coil Lc2 through the bellows flexible arm 25.

Thus, merely by applying a force to the second accommodating case 75 in a desired direction, the second accommodating case 75 (the coil surface of the second intermediate coil Lc2) may be oriented in the desired direction by the flexible arm 25 and furthermore the state is kept.

In the third embodiment, a resonant capacitor Cx2 is connected to the first intermediate coil Lc1 of the first accommodating case 72. The first intermediate coil Lc1, the capacitor Cx2, and the second intermediate coil Lc2 form a second resonant circuit.

As illustrated in FIG. 19, the second repeater 70 is arranged in the vicinity of the power supplying device 3. At this time, the front surface (the surface of the cover 73) of the first accommodating case 72 of the second repeater 70 is made opposed to the primary coil L1 of the power supplying device 3. Subsequently, the front surface (the surface of the cover 76) of the second accommodating case 75 of the second repeater 70 is oriented to the electric appliance (fan in the third embodiment) 10.

The accommodating case 18 extending from the bellows flexible arm 25 arranged at the electric appliance (fan in the present embodiment) 10 is oriented to the second accommodating case 75 of the second repeater 70. Thus, the second accommodating case 75 (second intermediate coil Lc2) of the second repeater 70 is opposed to the accommodating case 18 (secondary coil L2) of the electric appliance 10 with a long distance therebetween.

Subsequently, the first repeater 60 is arranged between the second accommodating case 75 of the second repeater 70 and the accommodating case 18 of the electric appliance 10.

The accommodating case 62 (intermediate coil Lc0) of the first repeater 60 is arranged between the second accommodating case 75 (second intermediate coil Lc2) of the second repeater 70 and the accommodating case 18 (secondary coil L2) of the electric appliance 10, and the cases are opposed to each other.

When the primary coil L1 of the power supplying device 3 is excited, the second resonant circuit, which includes the first intermediate coil Lc1, the second intermediate coil Lc2, and the capacitor Cx2 of the second repeater 70, resonates with a driving frequency of the primary coil L1. That is, the primary coil L1 magnetically resonates the second resonant circuit of the second repeater 70, and the primary coil L1 excites the second intermediate coil Lc2.

When the second intermediate coil Lc2 of the second repeater 70 is excited, the first resonant circuit, which includes the intermediate coil Lc0 and the capacitor Cx1 of the first repeater 60, resonates with the exciting frequency of the second intermediate coil Lc2.

That is, the second intermediate coil Lc2 magnetically resonate the first resonant circuit of the first repeater 60, and the second intermediate coil Lc2 excites the secondary coil L2 of the electric appliance 10 to supply power to the electric appliance 10.

This may realize a safe, secure, energy-saving, and convenient contactless power supplying system while increasing a power transmission distance and a power supply area.

In the third embodiment, one first repeater 60 and one second repeater 70 are arranged and however, according to usages, the plurality of first repeaters and the plurality of second repeaters may be used, or one or the plurality of either first repeater or second repeater may be used.

Figure 22:
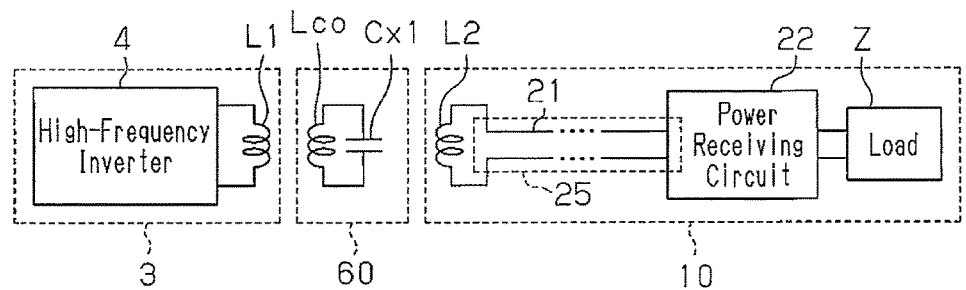
FIG. 22 is an electrical block circuit diagram illustrating the electrical structure of the contactless power supplying system.

In the case where the one first repeater 60 is arranged between the power supplying device 3 and the electric appliance 10, an electrical circuit illustrated in FIG. 22 is formed.

Figure 23:
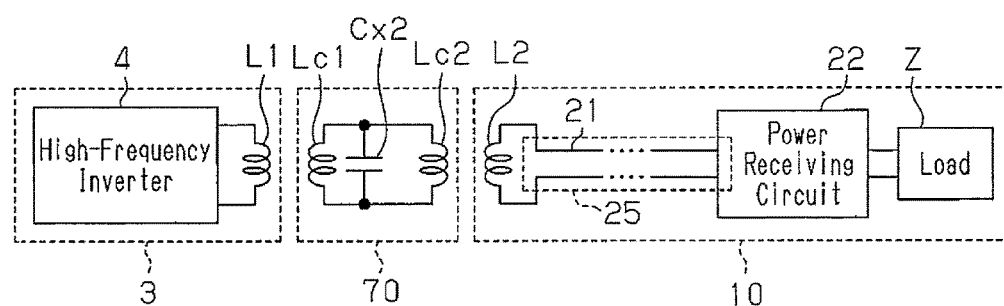
FIG. 23 is an electrical block circuit diagram illustrating the electrical structure in another example of the third embodiment.

In the case where the one second repeater 70 is arranged between the power supplying device 3 and the electric appliance 10, an electrical circuit illustrated in FIG. 23 is formed.

Figure 24:
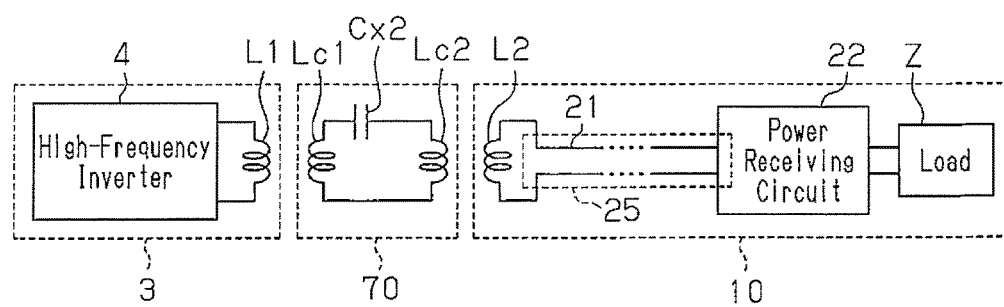
FIG. 24 is an electrical block circuit diagram illustrating the electrical structure in a further example of the third embodiment.

As illustrated in FIG. 23, in the second repeater 70, the resonant capacitor Cx2 is connected to the first intermediate coil Lc1 and the second intermediate coil Lc2 in parallel. Alternatively, as illustrated in FIG. 24, the resonant capacitor Cx2 may be connected to the first intermediate coil Lc1 and the second intermediate coil Lc2 in series. Of course, in the resonant circuit, the capacitor may be connected in series-parallel.

As in a repeater 80 illustrated in FIG. 25, the plurality of (two in FIG. 25) articulated flexible arms 15 (or bellows flexible arms) are arranged at the upper front end of a support table 81, and accommodating cases 72 and 75 may be attached to the respective front ends of the flexible arms 15.

In this case, the intermediate coils Lc1 and Lc2 accommodated in the accommodating cases 72 and 75 are connected to each other by the connecting wire 77 and connected to a capacitor (not illustrated) so as to form a resonant circuit. This may increase the degree of freedom in arrangement of the electric appliance 10 with respect to the power supplying device 3 and increase the distance between the electric appliance 10 and the power supplying device 3.

The above embodiments may be modified as follows.

In each of the above embodiments, the structure that has a variable shape and is adapted to be independently secured is the articulated flexible arm 15 or the bellows flexible arm 25. However, the structure is not limited to the arms 15 and 25, and may be any structure that has a variable shape and is adapted to be independently secured. Thus, the structure may be metal that has a variable shape and is adapted to be independently secured.

In each of the above embodiments, a resonant capacitor is not arranged with respect to the primary coil L1 and the secondary coil L2. However, the resonant capacitor may be connected to the primary coil L1 and the secondary coil L2 in serial or in parallel.

The invention claimed is:

1. A contactless power supplying system comprising:
a contactless power supplying device including a high-frequency inverter configured to supply a high-frequency current and a primary coil arranged to supplied with the high-frequency current;
an electric appliance including a secondary coil configured to generate induced electromotive force based on alternating magnetic flux generated by the primary coil and a power receiving circuit configured to supply the induced electromotive force generated by the secondary coil to a load;
a structure having a variable shape and adapted to be secured in a state in which the shape of the structure is varied;
at least one of a connecting wire, which is configured to connect the primary coil to the high-frequency inverter, a connecting wire, which is configured to connect the secondary coil to the power receiving circuit, and a connecting wire, which is configured to connect the power receiving circuit to the load, the at least one of the connecting wires arranged along the structure; and
a repeater arranged between the primary coil and the secondary coil, wherein
a position where the secondary coil is magnetically connected to the primary coil is spatially determined at a position depending on the shape of the structure being varied, and
the repeater includes:
a second structure arranged on a support table, the second structure having a variable shape and adapted to be secured in a state in which the shape of the second structure is varied; and
an intermediate coil supported via the second structure and configured to magnetically resonate with the alternating magnetic flux generated by the primary coil so that magnetic resonance of the intermediate coil causes the secondary coil to generate induced electromotive force to drive the electric appliance.

2. The contactless power supplying system according to claim 1, wherein
the structure is an articulated flexible arm.

3. The contactless power supplying system according to claim 1, wherein
the structure is a bellows flexible arm.

4. An electric appliance comprising:
a secondary coil configured to generate induced electromotive force based on alternating magnetic flux generated by a primary coil of a contactless power supplying device;
an accommodating case configured to accommodate the secondary coil;
a power receiving circuit configured to supply the induced electromotive force generated by the secondary coil to a load;
a structure arranged between a device body of the electric appliance and the accommodating case, the structure having a variable shape and adapted to be fixed in a state in which the shape of the structure is varied; and
a magnetic body arranged in the rear of the secondary coil in the accommodating case,
wherein a position where the secondary coil is magnetically connected to the primary coil is spatially determined at a position depending on the shape of the structure being varied.

5. The electric appliance according to claim 4, wherein the power receiving circuit is arranged in the device body, and
the electric appliance further comprises a connecting wire, which is configured to connect the secondary coil arranged in the accommodating case to the power receiving circuit, the connecting wire arranged along the structure.

6. The electric appliance according to claim 4, wherein the power receiving circuit and the secondary coil are accommodated in the accommodating case, and
the electric appliance further comprises a connecting wire, which is configured to connect the load to the power receiving circuit, the connecting wire arranged along the structure.

7. The electric appliance according to claim 4, wherein the structure is an articulated flexible arm.

8. The electric appliance according to claim 4, wherein the structure is a bellows flexible arm.

9. The electric appliance according to claim 4, wherein the structure includes a bottom end having a connector, and
the connector is attachable to a connector arranged in the device body.

10. The electric appliance according to claim 9, wherein the connector is a USB-applicable connector.

11. The electric appliance according to claim 4, further comprising a cover covering the accommodating case.

12. The electric appliance according to claim 11, wherein the cover has an accessory.

13. A repeater arranged between a contactless power supplying device including a primary coil and an electric appliance including a secondary coil, the repeater comprising:
an intermediate coil configured to magnetically resonate with alternating magnetic flux generated by the primary coil so that magnetic resonance of the intermediate coil causes the secondary coil to generate induced electromotive force;
an accommodating case configured to accommodate the intermediate coil; and
a structure arranged on a support table and supporting the accommodating case, the structure having a variable shape and adapted to be secured in a state in which the shape of the structure is varied,
wherein a position where the intermediate coil is magnetically connected to the primary coil and the secondary coil is spatially determined at a position depending on the shape of the structure being varied.

14. The repeater according to claim 13, further comprising a resonant capacitor connected to the intermediate coil.

15. The repeater according to claim 13, wherein
the accommodating case is one of a plurality of accommodating cases supported by the support table via the structure, and
the intermediate coil is accommodated in each of the accommodating cases so that the intermediate coils in the accommodating cases form a resonant circuit.

16. The repeater according to claim 13, further comprising:
a second structure having a variable shape and adapted to be secured in a state in which the shape of the second structure is varied;

a second intermediate coil coupled to the accommodating case via the second structure, the second intermediate coil forming a resonant circuit together with the intermediate coil; and a second accommodating case configured to accommodate the second intermediate coil.

17. An adaptor supplying power to an electric appliance, the adaptor comprising:

a secondary coil configured to generate induced electromotive force based on alternating magnetic flux generated by a primary coil of a contactless power supplying device;

an accommodating case configured to accommodate the secondary coil;

a connector attachable to the electric appliance;

a structure arranged between the accommodating case and the connector, the structure having a variable shape and adapted to be secured in a state in which the shape of the structure is varied;

a connecting wire arranged along the structure and configured to connect the secondary coil to the connector; and a magnetic body arranged in the rear of the secondary coil in the accommodating case, wherein a position where the secondary coil is magnetically connected to the primary coil is spatially determined at a position depending on the shape of the structure being varied.

18. The adaptor according to claim 17, wherein the structure is a bellows flexible arm, and the connecting wire is arranged in the flexible arm.

19. The adaptor according to claim 17, wherein the connector is a USB-applicable connector.

20. The adaptor according to claim 17, further comprising a cover covering the accommodating case.

21. The adaptor according to claim 20, wherein the cover has an accessory.

* * * * *